United States Patent

Bouchard et al.

[11] Patent Number: 4,648,284
[45] Date of Patent: Mar. 10, 1987

[54] APPARATUS AND METHOD FOR REDUCING GYRO ACTIVATION TIME

[75] Inventors: John Bouchard, Canton; Robin Ray, Sharon, both of Mass.

[73] Assignee: Northrop Corporation, Hawthorne, Calif.

[21] Appl. No.: 617,228

[22] Filed: Jun. 4, 1984

[51] Int. Cl.⁴ .................. G01C 19/20; G01C 19/24
[52] U.S. Cl. ................................. 74/5.46; 74/5.5
[58] Field of Search .................. 74/5.46, 5.5; 308/10

[56] References Cited

U.S. PATENT DOCUMENTS

| | | | |
|---|---|---|---|
| 3,146,038 | 8/1964 | Lautzenhiser | 308/10 |
| 3,261,210 | 7/1966 | Buchhold | 308/10 X |
| 3,787,100 | 1/1974 | Habermann et al. | 308/10 |
| 3,860,300 | 1/1975 | Lyman | 308/10 |
| 4,211,452 | 7/1980 | Poubeau | 308/10 |
| 4,316,394 | 2/1982 | Dohogne | 74/5.46 |
| 4,444,444 | 4/1984 | Benedetti et al. | 308/10 |

Primary Examiner—Rodney H. Bonck
Attorney, Agent, or Firm—Kenway & Jenney

[57] ABSTRACT

The apparatus and method for reducing gyro activation time is to be used with a gyroscope including a float floated within an outer case. An electromagnetic suspension is provided for maintaining the float at an equilibrium position within the outer case. In accordance with the present invention, the centering force is increased and the activation time decreased by selectively disabling one of the electromagnets in the suspension.

2 Claims, 6 Drawing Figures

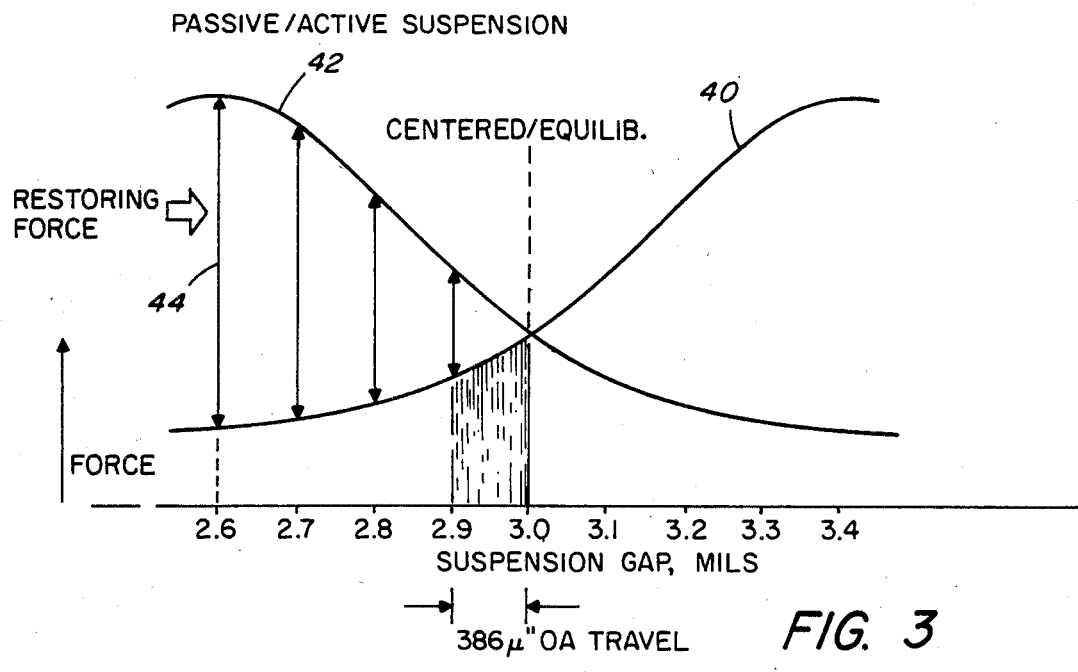
FIG. 3
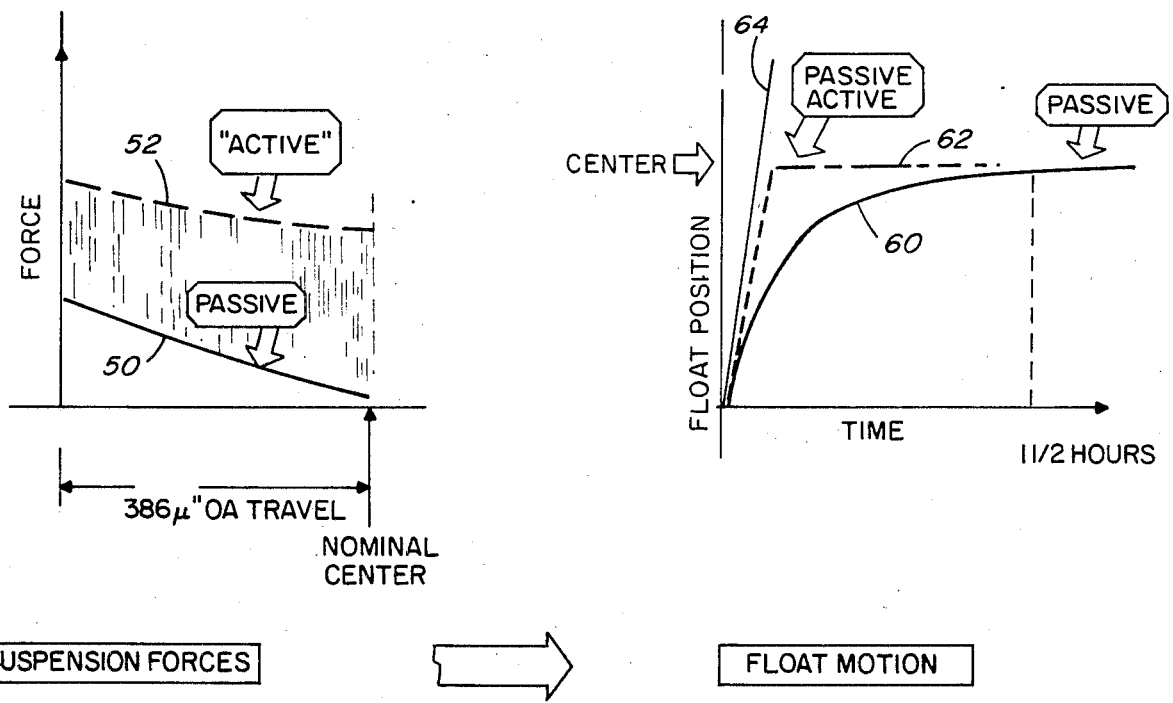
FIG. 4
FIG. 5

APPARATUS AND METHOD FOR REDUCING GYRO ACTIVATION TIME

BACKGROUND OF THE INVENTION

This invention relates to gyroscopic instruments and more particularly to apparatus for reducing gyro activation time.

The most accurate single degree of freedom gyroscopes and pendulous integrating gyro accelerometers utilize a spinning wheel encased in a "can" which in turn is floated or made neutrally buoyant by being contained in a flotation fluid within the can so as to minimize torque uncertainties caused by accelerations. The "can" or as it is more commonly known, "float" is additionally suspended by passive electromagnetic apparatus to locate the float at a consistent equilibrium position inside the case to prevent solid contact with the instrument's outer housing or case. The gyro case contains components including a module which indicates the float's angular orientation within the case and one which provides torque to maintain the float at a constant angular reference position within the housing. In this way, the torque required to maintain the float at a constant angular reference orientation within the case is a measure of the angular rate of the gyro about its input axis. The float, utilizing its spinning element, thus senses angular rate as a torque. Consequently, spurious torques that are non-rate induced provide an erroneous indication of rate and are therefore undesirable.

The suspension of the float ideally prevents changes in torques caused by float/case coupling by maintaining the float at a constant equilibrium position relative to the case. Because the suspension forces, if changed, result in spurious torques in themselves, it is desirable to limit these suspension forces to the minimum required to hold constant float position under benign conditions. To provide benign conditions, gyros are generally maintained at a constant temperature during operation.

During gyro shut down, however, the float is not maintained in its operating equilibrium position. Fluid contraction within the case, float buoyancy changes, and lack of suspension force all combine to allow the float to move from its equilibrium position. During warm-up, the float is pulled by the passive electromagnetic suspension into its equilibrium position. While the float is moving to its equilibrium position, spurious torques cause an undesirable rate indication or error which is called "drift uncertainty". There is a strong correlation between this undesirable drift uncertainty and float position away from the equilibrium position. Several hours are typically required to bring the float into its equilibrium operating position.

It is an object of this invention, therefore, to provide apparatus which significantly shortens the time required for the float to attain its equilibrium position.

Another object of the invention is such apparatus which utilizes existing gyro hardware.

It is yet another object of the invention to provide apparatus for shortening activation time which is simple, inexpensive and easy to manufacture.

SUMMARY OF THE INVENTION

These and other objects of the invention are achieved in an inertial instrument having a gyro wheel disposed within a float floated in a fluid within a case and including electromagnetic apparatus for centering the float within the case. This electromagnetic apparatus includes electromagnets disposed on opposite sides of the case for interaction with tapered, magnetically permeable rings disposed on the float. The apparatus for speeding up the centering of the float includes components for determining the location of the float within the case and circuitry for selectively disabling one of the electromagnets.

BRIEF DESCRIPTION OF THE DRAWING

The invention disclosed herein will be better understood with reference to the following drawing of which:

FIG. 3 is a graph of restoring force versus float location;

FIG. 4 is a graph of restoring force versus float displacement from equilibrium position;

FIG. 5 is a graph of float position with time; and

DESCRIPTION OF THE PREFERRED EMBODIMENT

Figure 1:
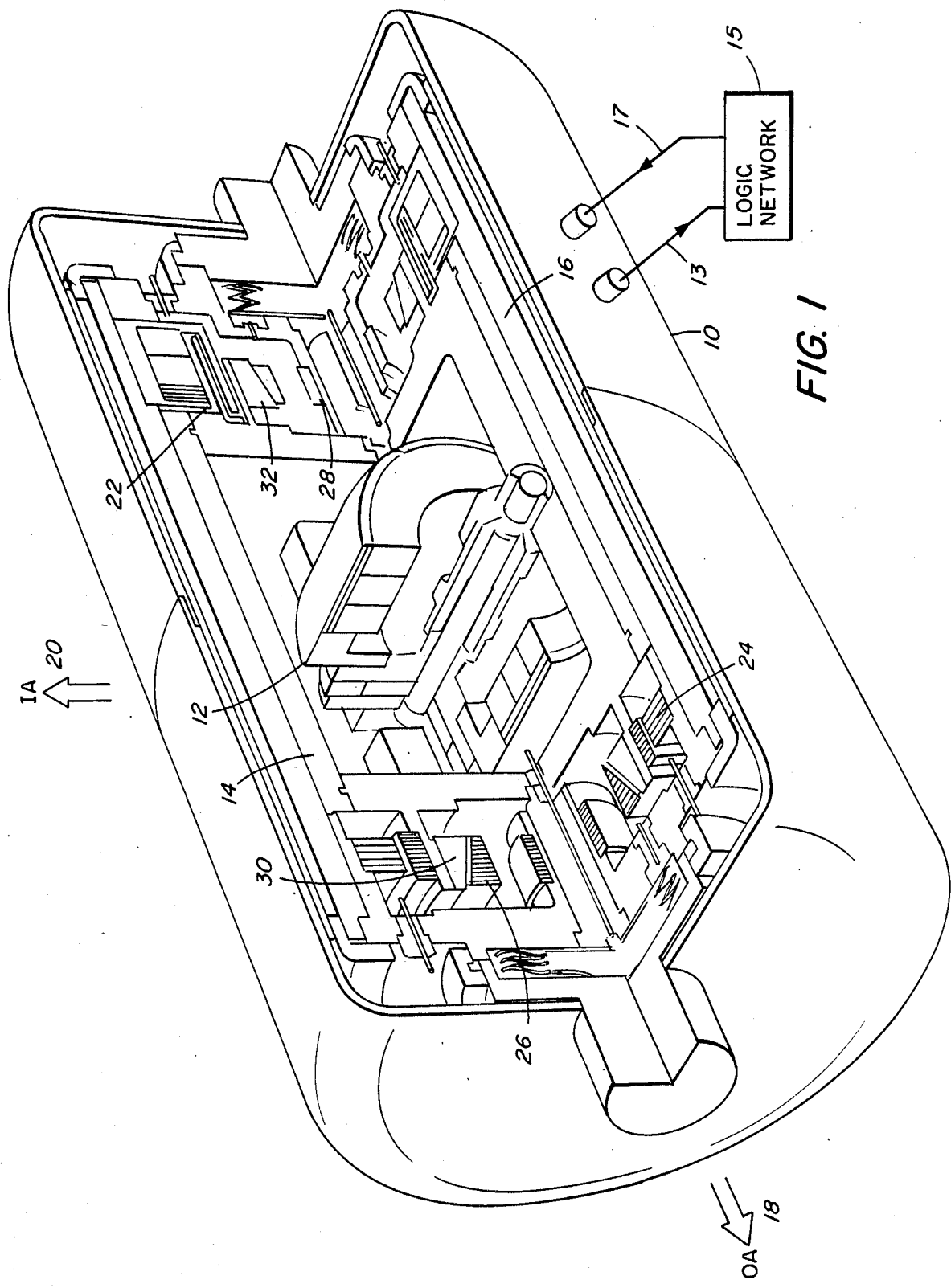
FIG. 1 is a perspective view, with parts broken away, of a gyro utilizing the present invention.

With reference first to FIG. 1, a single degree of freedom gyro 10 includes a gyro wheel 12 supported for rotation within a float 14. The float 14 is floated in a fluid contained within an outer case 16 of the gyro 10. The float 14 is supported within the outer case 16 for rotation about an output axis 18. In operation, angular rates of the gyro case 16 about an input axis 20 will cause the float 14 to rotate about the output axis 18. The tendency to rotate about the output axis 18 is opposed by torques generated by a torque generator 22. A signal generator 24 is responsive to angular rotations about the output axis 18 and is used in a control loop fashion to maintain the float 14 at a null orientation.

Since the float 14 is floated in a fluid disposed between the float 14 and the outer case 16 of the gyro 10, additional apparatus must be provided to keep the float 14 from coming into contact with the housing 16. The additional suspension is provided by the interaction of electromagnets mounted on the case 16 with magnetically permeable rings mounted on the float 14. In particular, electromagnetics 26 and 28 are rigidly mounted with respect to the outer case 16 of the gyro 10. The electromagnets 26 and 28 have a tapered configuration to interact with tapered magnetically permeable rings 30 and 32 mounted on the ends of the float 14. Because the electromagnets and rings are tapered, both forces along the output axis 18 and radial forces are generated. The centering force along the output axis 18 is the force with which this invention is related.

Figure 2:
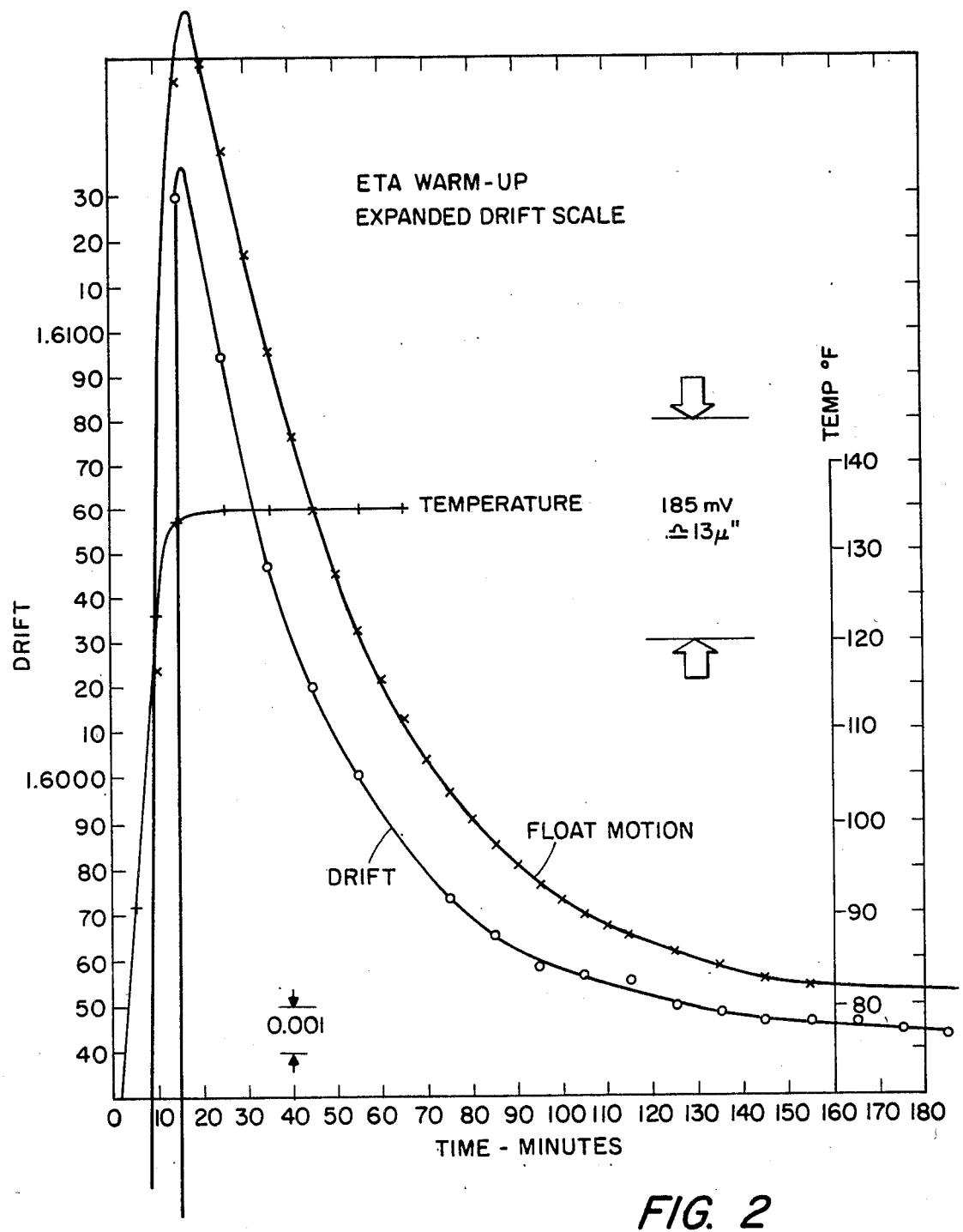
FIG. 2 is a graph illustrating the correlation between float motion and gyro drift.

A brief explanation of the electromagnetic suspension will now be provided in order to make clear the invention herein. The circuitry (not shown) used to control each of the electromagnets 26 and 28 is tuned with capacitors to be on the inductive side of resonance. As the gap between the electromagnet 26 and the associated magnetically permeable ring 30 increases, inductive and capacitive reactance more nearly cancel allowing the total impedance to become purely resistive, i.e., resonance. This arrangement permits a higher current to flow in the electromagnet 26 and thus causes an increase in the attractive force between the magnetically permeable tapered ring 30 and the electromagnet 26 as the gap increases. The same relationship applies to the electromagnet 28 and its associated tapered magnetically permeable ring 32. This electromagnetic suspension of the float 14 acts as opposing springs would, each pulling in the opposite direction and causing a net centering force along the output axis 18 that is proportional only to the difference between the two forces. Because the net centering force is proportional only to the difference between the two opposing forces, the net force in either direction is quite small. For this reason, it normally takes several hours to center the float 14 during warm up because the small net centering force is opposed by the relatively large piston type damping due to the viscous drag of the fluid. As stated earlier, there is a strong correlation between drift errors and the motion of the float 14 within the outer case 16. FIG. 2 illustrates this correlation in graphical form. Note that gyro drift is high when the float is farthest from its equilibrium operating position. It is thus highly desirable to speed up the float motion toward its equilibrium position so as to decrease drift at a more rapid rate.

FIG. 3 illustrates the centering restoring force in relation to float displacement. For example, suppose the float is located to the left of the centered/equilibrium position shown in FIG. 3. A curve 40 represents the force versus suspension gap for the electromagnet 28 and magnetically permeable ring 32 and thus indicates a force pulling toward the left. Similarly, a curve 42 represents the force on the float 14 generated by the electromagnet 26 interacting with the magnetically permeable ring 30. This force pulls the float toward the right in FIG. 1. The net restoring force is indicated by arrows 44 between the curves 40 and 42. Note that the arrows 44 get shorter as the float moves toward the equilibrium position. Thus, the closer the float is to equilibrium, the smaller the restoring force.

The applicant herein recognized that the restoring force is increased if one of the electromagnets is disabled when the float is displaced from the equilibrium position. If, for example, the float were located to the left of its equilibrium position, the electromagnet 28 is turned off so as not to oppose the force generated by the electromagnet 26 interacting with the magnetically permeable ring 30. While the electromagnet 28 is disabled, the restoring force of curve 42 is thus higher than would otherwise be the case.

FIG. 4 is a graph of centering force versus travel of the float 14 along the output axis 18. A lower curve 50, labeled "passive" shows the centering force in known systems. This mode of operation is deemed "passive" in that the magnetic attraction between the electromagnets and magnetically permeable rings increases with gap distance because of operation of the electromagnets on the inductive side of resonance as discussed above. The centering action is thus passive in that it is analogous to a mass suspended between stretched springs. A curve 52 labeled "active" represents the force curve when one of the electromagnets is disabled. Note that with the passive system illustrated by the curve 50, the restoring force approaches zero at the equilibrium position. Thus, when the float 14 is near the equilibrium position, its velocity toward the center is progressively slower. With the active system, the force does not fall to zero at the equilibrium position.

FIG. 5 illustrates float motion. A curve 60 shows float 14 position as a function of time using the "passive" system in which both of the electromagnets 26 and 28 are operative. It is seen that over one and a half hours are required for the float to reach the vicinity of its equilibrium position. A curve 62 shows float motion utilizing a passive/active strategy. When the float 14 is significantly off center, only one of the electromagnets is activated. The centering force is thus high, resulting in rapid motion of the float 14 toward the center. When the float 14 has reached the vicinity of the equilibrium position, within a preselectable limit, both electromagnets are activated to resume the passive mode. The time for reaching equilibrium, the activation time, is much shorter utilizing the control technique of the present invention. FIGS. 4 and 5 show that the centering force in the active mode is perhaps twice as great as the force in the passive mode at float position extremes and is infinitely larger in the equilibrium position where the force in the passive mode becomes zero. In FIG. 5, a line 64 is the slope of the curve 62 at the time origin. The curve 64 has approximately twice the slope of the curve 60 at the origin indicating a higher rate of float motion toward equilibrium.

The operation of the gyro 10 utilizing the control scheme of this invention will now be discussed. The gyro 10 has a float position readout signal 13 available which can be utilized to define the float equilibrium position along the output axis 18. A logic network or microprocessor 15 periodically probes float position so as to define when to use the active and passive suspension modes and generates a signal 17 to select either the active or passive mode. When the float is off-center beyond a preselectable limit, the active mode is used (one electromagnet turned off). As the float 14 reaches the vicinity of the equilibrium position within the preselectable limit, the control is switched to the passive mode in which both electromagnets are operative. In a typical embodiment, the preselectable limit would be a few microinches. By using a combination of active and passive modes, the warm up or activation time for the gyro 10 can be considerably reduced. Furthermore, the same hardware can be utilized in the active mode during warm up and periods of transition, such as wheel speed (and power) changes and then returned to the passive mode when the float is sensed as being adequately centered. In this way, the same gyro or pendulous integrating gyro accelerometer hardware components can provide benign centering force during instrument operation and provide a significantly enhanced centering force during warm up and transitional periods.

Figure 6:
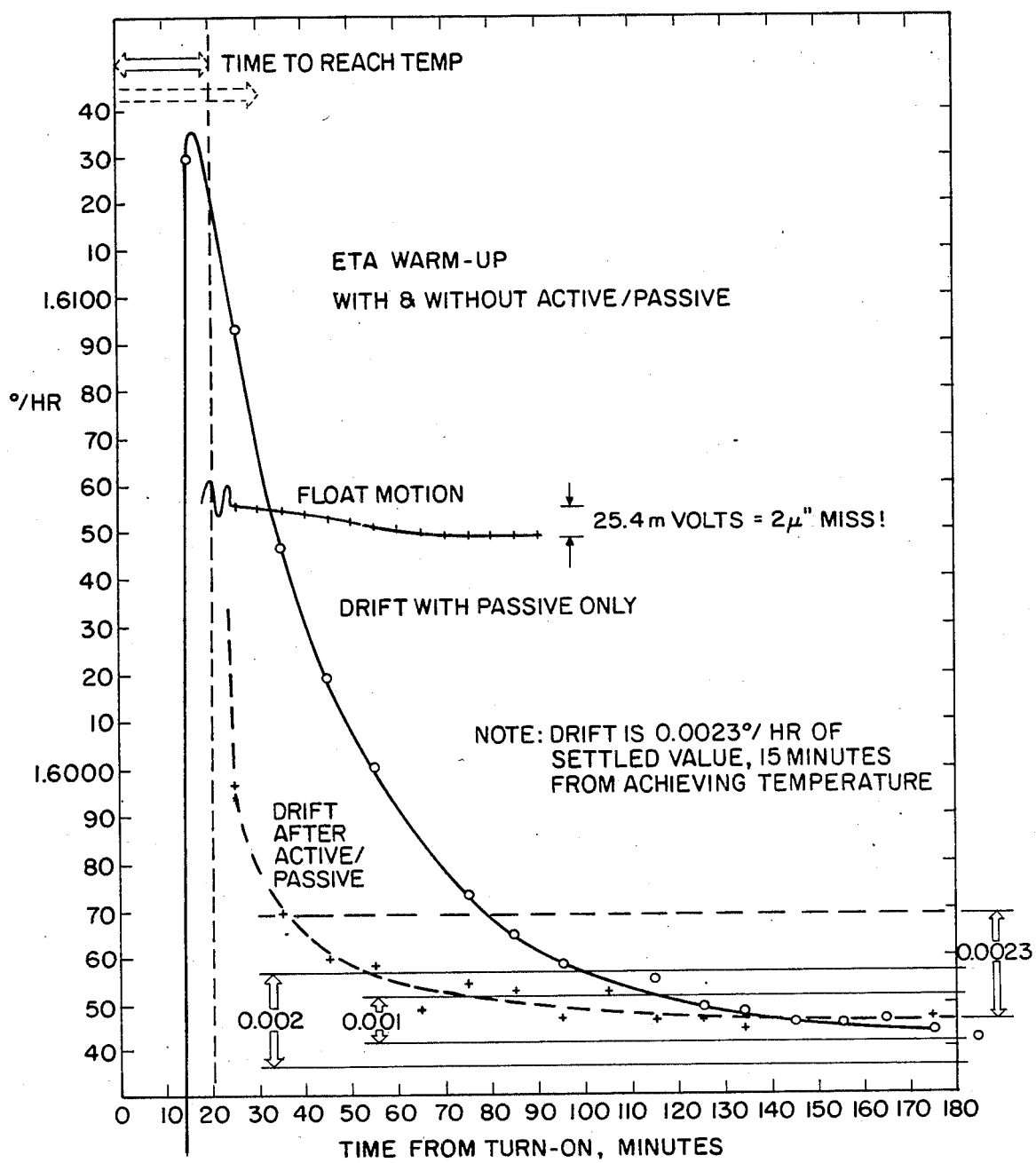
FIG. 6 is a graph of drift as a function of time.

FIG. 6 is a comparison of gyro drift versus time with a gyro utilizing only the passive mode and a gyro utilizing both active/passive mode. It is readily apparent that gyro drift decreases much more rapidly using the technique of the present invention.

It is thus seen that the objects of this invention have been achieved in that there has been disclosed apparatus and method for reducing gyro activation time. The technique makes use of existing gyro hardware components and speeds up float motion toward its equilibrium position by periodically and selectively disabling one of the electromagnets to allow for higher centering forces.

It is recognized that modifications and variations will occur to those skilled in the art and it is intended that all such modifications and variations be included within the scope of the appended claims.

What is claimed is:

1. In an inertial instrument having a gyro wheel disposed in a float floated in a viscous fluid within a case having means for determining the location of the float within the case and including electromagnet means for centering said float at an equilibrium position with in said case, said electromagnetic means including electromagnets disposed on opposite sides of said case for interaction with magnetically permeable rings disposed on said float;

apparatus for speeding up the centering of said float comprising circuitry for selectively disabling one of said electromagnets when said float exceeds a preselectable distance from said equilibrium position to speed up the centering and for re-enabling said one of said electromagnets when said float is within said preselectable distance from said equilibrium position.

2. In an inertial instrument having a gryo wheel disposed in a float floated in a viscous fluid within a case including means for determining the location of said float within said case and including electromagnetic means for centering said float at an equilibrium position within said case, said electromagnetic means including electromagnets disposed on opposite sides of said case for interaction with magnetically permeable rings disposed on said float;

method for speeding up the centering of said float comprising determining the location of said float within said case; and selectively disabling one of said electromagnets when said float exceeds a preselectable distance from said equilibrium position to speed up the centering and re-enabling said one of said electromagnets when said float is within said preselectable distance from said equilibrium position.

* * * * *